J. B. CRUMP.
POTATO PLANTING APPARATUS.
APPLICATION FILED SEPT. 27, 1912.

1,052,893.

Patented Feb. 11, 1913.
2 SHEETS—SHEET 1.

Witnesses:
James R. Mansfield
L. E. Witham

Inventor
John B. Crump
By
Alexander & Dowell
Attorneys

J. B. CRUMP.
POTATO PLANTING APPARATUS.
APPLICATION FILED SEPT. 27, 1912.
1,052,893.
Patented Feb. 11, 1913.
2 SHEETS—SHEET 2.
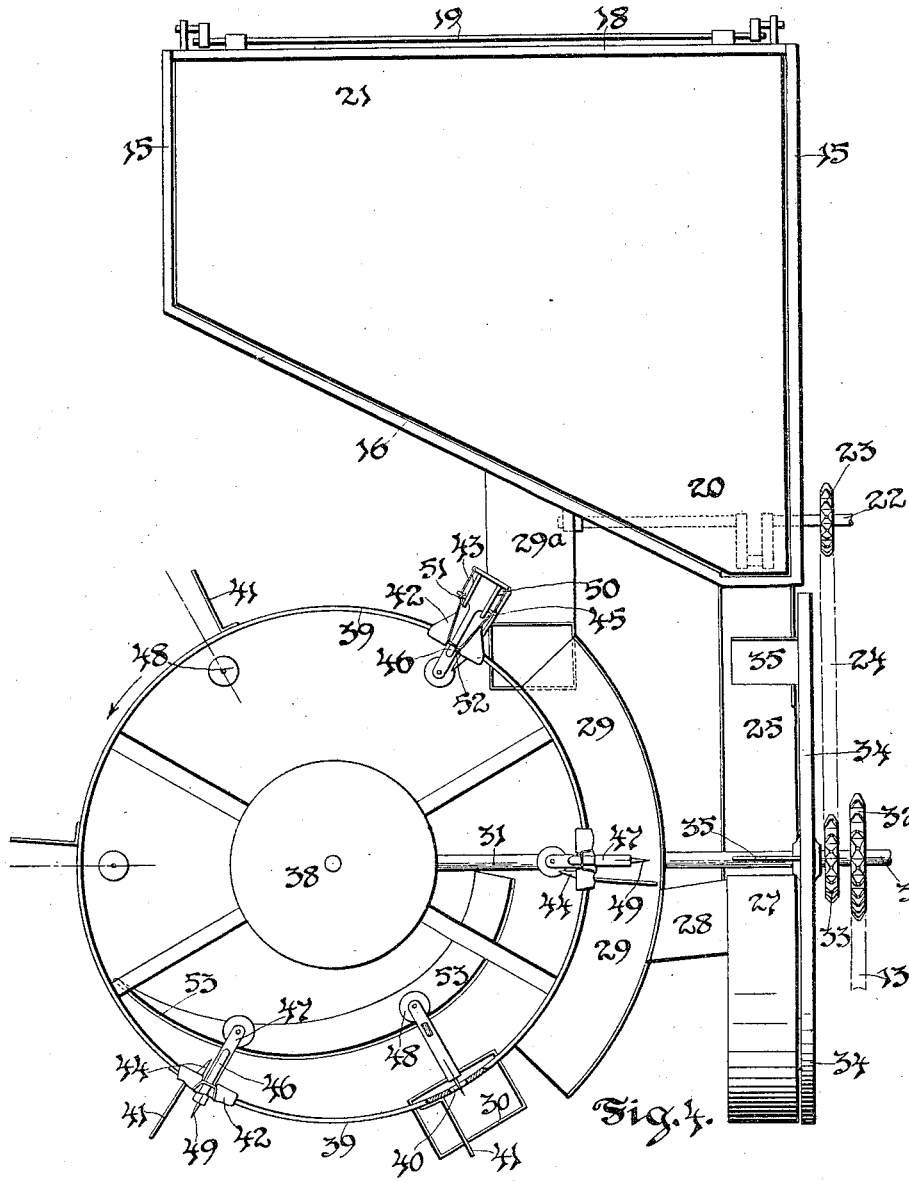
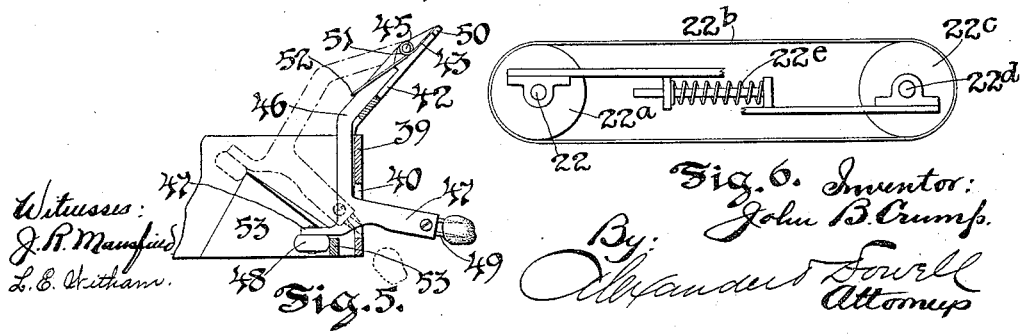

UNITED STATES PATENT OFFICE.

JOHN BRETNELL CRUMP, OF BALLARAT, VICTORIA, AUSTRALIA.

POTATO-PLANTING APPARATUS.

1,052,893. Specification of Letters Patent. Patented Feb. 11, 1913.

Application filed September 27, 1912. Serial No. 722,646.

*To all whom it may concern:*

Be it known that I, JOHN BRETNELL CRUMP, a subject of the King of Great Britain and Ireland, residing at 6 Loch avenue, in the city of Ballarat, in the county of Grenville, State of Victoria, Commonwealth of Australia, have invented certain new and useful Improvements in Potato-Planting Apparatus, of which the following is a specification.

This invention relates to apparatus for attachment to plows for planting potato seed.

Hitherto a common proposition has been to provide a hopper containing the potatoes or seed and to pass through or into the said hopper a series of needles with the object of delivering the said seeds, at predetermined distances apart, to the furrow formed by the plow. Practice has shown that with a quantity of seed present in the hopper the needles often fail to penetrate a seed, owing to the irregular conformation thereof and one being superimposed above the other, there is frequently a vacant space into which the needle passes, or else the seed moves with the needles and not offering sufficient resistance thereto is not penetrated thereby. Previous suggestions have not proved thoroughly effective in actual practice and moreover they often require manual attention.

This invention aims most particularly at feeding the seed from the hopper to the needles in such a manner that a potato is always delivered to the furrow and each needle cannot fail to pierce a seed. Its success consists chiefly in maintaining the hopper and the piercing needles entirely separate and distinct. The needles are situated in a horizontal plane above the hopper and elevating means are employed to provide a seed or seeds for every needle. The seed which is not used is returned to the hopper for re-feeding. A seed is always in alinement with its needle during the piercing movement of that element.

The invention is cheap and simple in construction and positive in action, no manual attention of any description being required during working operations.

The invention also provides for driving the apparatus from the back wheel of the plow in an unfailing and simple manner.

Figure 1:
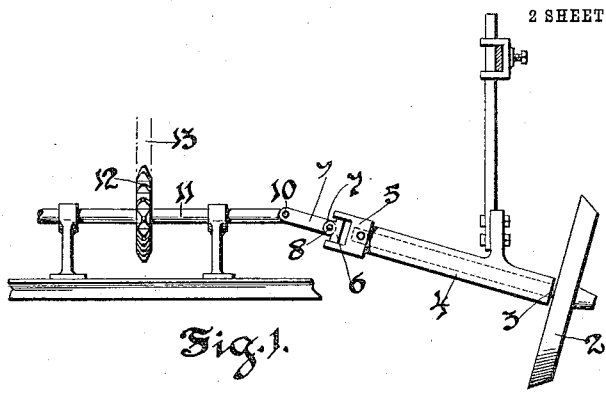
Figure 2:
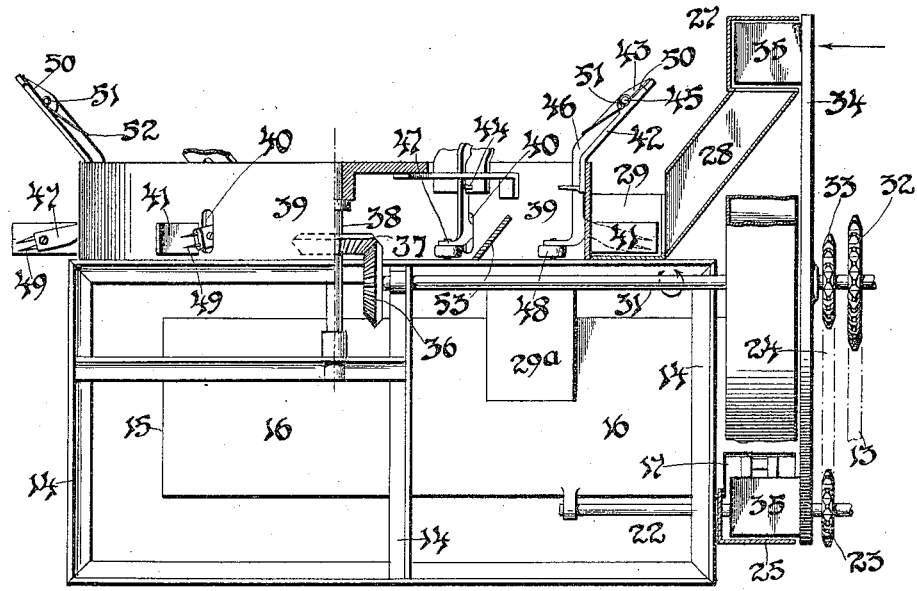
Figure 3:
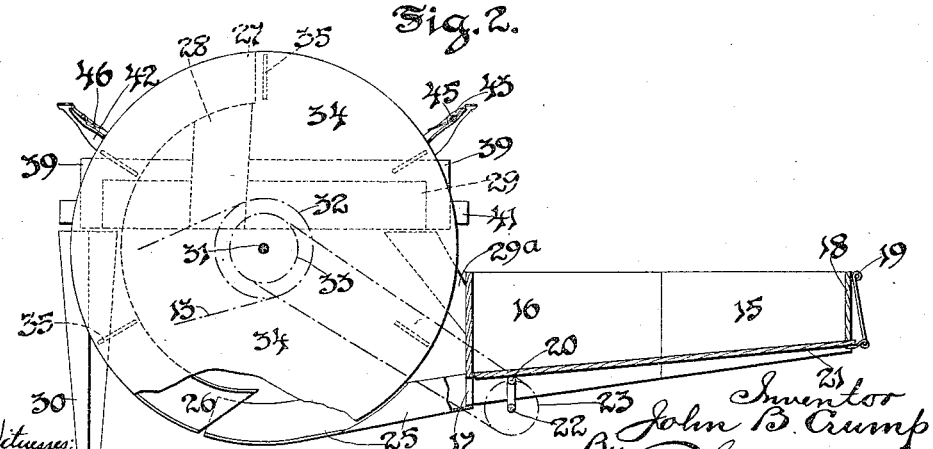

Referring to the drawings which form a part of this specification:—Figure 1 is a detail front view of a back wheel of a plow from which the drive to operate the apparatus is taken. Fig. 2 is a rear elevation partly in section of the potato planting apparatus portions being broken away for convenience of illustration. Fig. 3 is a side elevation partly in section of the potato planting apparatus on a reduced scale and looking in the direction of the arrow seen in Fig. 2. Fig. 4 is a plan view of the apparatus. Portions are omitted for convenience of illustration. Fig. 5 is an enlarged part sectional detail view showing a crank lever and a double of two-point needle carried thereby. In full lines a roller on the said lever is shown engaging the entry end of a cam pathway, and in dotted lines its position is shown shortly before leaving the said pathway. Fig. 6 is a view of a modification to be applied to the hopper.

The apparatus may be mounted on a plow which may be of any desired character and of itself forms no part of the present invention. Secured to the back wheel 2 of the plow is one end of an axle 3 rotating in a sleeve or bearing 4. The bearing may be attached to a dropper or the like secured to the plow frame. Secured to the other end of the axle 3 is a collar 5 which bears against the sleeve or bearing 4. Extending across the collar 5 is a pin 6 protruding from which may be a lug or lugs 7. To the lug 7 is pivoted at 8 one end of a link 9 the other end of which is pivoted at 10 to one end of a spindle 11. The spindle 11 is mounted in any suitable bearings carried by the frame of the plow. Secured to the spindle 11 is a first sprocket wheel 12 around which passes a first sprocket chain 13.

Mounted in any well known way upon the frame of the plow is a framework 14. Secured to the framework 14 is a hopper having two sides 15 between one end of which extends a rear piece 16 having therein a delivery hole 17. Hinged to and extending between the other end of the sides 15 is a back 18. This is pivoted by a pivot pin 19 or the like extending from or between the said sides 15. Between the sides 15 is also a bottom having a rising and falling rear end 20 and a front end 21 pivotally connected to the lower end of the hinged piece 18. Mounted in suitable bearings below the bottom of the hopper is a crank shaft 22. The rear end 20 of the hopper bottom rests loosely upon the crank shaft and rises and falls with the rotation of the crank thereof. Mounted upon the crank shaft 22 is a second sprocket wheel 23 around which passes a second sprocket chain 24.

Instead (Fig. 6) of providing the hopper with a hinged front and a rising and falling bottom the crank of the shaft 22 may be dispensed with and a pulley wheel 22$^a$ be mounted thereon. Passing around the pulley 22$^a$ is a belt 22$^b$ which also passes around a second pulley wheel 22$^c$ turning upon an idle shaft 22$^d$ below the hopper. The distance between the pulleys is controlled by a spiral spring 22$^e$ or the like, the tension of the belt being thereby always maintained.

Adjoining the delivery hole 17 of the hopper is a lower segmental chute or pathway 25. One end of this communicates with the said delivery hole. Communicating with the other end of the chute 25 is the lower end 26 of a curved guide, which lower end is skived or elevated and passes over or above said chute 25. The upper end 27 of the guide communicates with a chute 28. Below and in communication with the first chute 28 is an upper horizontal segmental receiving trough 29. Also mounted in the framework 14 is a second or return chute 29$^a$ and a third or furrow or delivery chute 30.

Mounted in suitable bearings carried by the framework is a first shaft 31 having secured to one end a third sprocket wheel 32 and fourth sprocket wheel 33. The first sprocket chain 13 passes around the third sprocket wheel 32. The second sprocket chain 24 passes around the fourth sprocket wheel 33. Mounted upon the first shaft 31, adjacent the sprocket wheels, is a vertical elevating disk 34 having inwardly protruding wings or elevators 35. These wings or elevators move in the chute and guides 25—26—27. Secured to the inner end of the first shaft 31 is a first bevel wheel 36 gearing with a second bevel wheel 37 mounted upon a second shaft 38.

With the foregoing is used a horizontal rotary needle carrier for distributing the seed in the furrow. This is mounted upon and driven by the second shaft vertical 38. It consists of a band or ring 39 having therein a series of slotways 40. Projecting outwardly from the band or ring 39, adjacent each slotway, is a seed aliner 41. Secured to the said band 39, adjacent each slotway 40, is also an upwardly and outwardly inclined plate 42 having projecting therefrom lugs 43. Projecting from the lower end of each plate 42, or from the band 39, is a guiding arm 44.

Pivoted by a pivot pin 45 to the lugs 43 of each plate 42 is a crank lever having an upper long arm 46 and a lower short arm 47. Carried by each short arm 47 is a friction roller 48. Also carried by each said short arm 47 is a needle or needles 49. These may be adjustable in relation to the short arms in any suitable manner. Controlling each crank lever is a spring consisting of two legs 50 each of which has a coil 51 passing around its pivot pin 45. Between the legs is a cross or bridging member 52 lying on the arm 46. The ends of the legs of the springs bear upon the plates 42.

Carried by the framework 14 is a cam 53 with which the rollers 48 engage, the needles 49 thereby moving inwardly and outwardly through the slotways 40.

With this invention potatoes or potato seeds are placed in the hopper. The apparatus is mounted upon any suitable portion of the frame of a plow. Upon the plow moving forwardly the sprocket wheel 12 rotates and by the first sprocket chain 13 rotates the third sprocket wheel 32. This turns the first shaft 31 which by the fourth sprocket wheel 33 and second sprocket chain 24 rotates the second sprocket wheel 23. The crank shaft 22 is thereby rotated and alternately lifts and lowers the bottom of the hopper. As the rear end 20 of the bottom rises it obviously closes the delivery hole 17 in the front 16 of the hopper and as it falls it permits potatoes to pass from the hopper through the said hole to the chute 25. The rising and falling movement of the hopper bottom also agitates the potatoes or seed. The feed belt 22$^b$ may be used however, instead of the rising and falling hopper bottom as only a limited number of potatoes can gather in the chute 25 and the passage of the belt will agitate the potatoes in the hopper. As the elevating disk 34 rotates, through the rotation of the shaft 31, its wings or elevators 35 pass through the said chute 25 and lifts the potato or potatoes therein upwardly from the lower end 26 to the upper end 27 of the delivery guide. The potato or potatoes then fall through chute 28 into the trough 29. By the bevel wheels 36 and 37 the second shaft is rotated and with it the needle carrier. As the needle carrier rotates the rollers 48 of the crank levers are successively engaged with the cam 53. The short arm 47 of each crank lever is thereby moved inwardly through its slotway 40. Upon a crank lever reaching the chute 28 it is about to disengage from the cam. The seed in the trough 29 is now bearing against and being carried forward by the seed aliner 41 of the lever. Upon the friction roller 48 reaching the end of the cam 53 the spring controlling the crank lever immediately asserts itself and forces the short arm 47 and the needle or needles 49 carried thereby outwardly. The needle or needles thereby penetrate the potato or seed bearing at the time against the aliner 41 in the trough 29. The trough is obviously cleared of any surplus potatoes by the circumferential travel of the crank lever. The needle carrier continuing to rotate the friction roller 48 of the crank lever will once more engage the cam 53 and the lower arm 47 again be drawn inwardly. The potato is thus discharged from the needle or needles 49 and enters into the delivery chute 30 from which it falls into the furrow. By the rising and falling movement of the front end 20 of the hopper bottom, a limited quantity of potatoes or seed is delivered into the lower segmental chute 25 for elevation by each of the wings or elevators 35 of the elevating disk, but this is not an essential as the use of the belt 22$^b$ is quite effective. Such a limited quantity, however, may be delivered into the upper circumferential trough 29 for each crank lever and needle or needles carried thereby. Each needle is in any case fed separately and cannot fail to penetrate a potato or seed for its supply is confined by the wall of the trough 29 and its aliner 41. The feeding arrangements it is considered are the chief element of success in the present invention.

Having now described my invention what I claim as new and desire to secure by Letters Patent is:—

1. In a potato planting apparatus, a horizontal rotary needle carrier consisting of a band having therein a plurality of slotways, a seed aliner projecting from said band adjacent each slotway, a crank lever pivotally carried by the band adjacent each slotway, a spring controlling each lever, a friction roller carried by each lever, a needle carried by each lever and passing through a corresponding slotway in the band, and a cam engaged by the friction rollers.

2. A potato planting apparatus consisting of a hopper, means for agitating the seed within said hopper and feeding seed therefrom, a horizontally disposed needle carrier above said hopper, means for elevating to said carrier the seed discharged from the hopper, and means for returning to the hopper any seed not delivered to the furrow by the needle carrier.

3. In potato planting apparatus, a trough, a rotary needle carrier beside the trough consisting of an annular band having slots, a vertically disposed needle lever pivoted on the band adjacent each slot and adapted to operate in the trough through such slot, a spring for each needle lever, and a cam controlling all said needle levers.

4. A potato planting apparatus consisting of a hopper, a seed elevator adjacent said hopper, a trough into which the elevator discharges, an annular slotted needle carrier, a series of needle levers pivotally mounted on said carrier adjacent the slots therein and adapted to project through the slots into said trough, and a cam located in said carrier controlling the needle levers.

5. A potato planting apparatus consisting of a hopper having agitating means therefor, an elevating disk adjacent said hopper, a trough into which the elevating means discharges, an annular needle carrier having a series of slots, spring controlled needle levers pivoted on said carrier and adapted to operate through said slots and engage potatoes in said trough and a cam controlling the needle levers.

6. In a potato planting apparatus, a vertical circumferential delivery guide, means for supplying seed to said guide, a circumferential receiving trough to which said guide discharges, elevating means passing through the vertical guide, and a rotary needle carrier having seed aliners passing through the trough.

7. In potato planting apparatus the combination of a hopper, a vertical circumferential guide communicating with said hopper, an elevator disk mounted upon said shaft and operating in the guide, a horizontal curved seed receiving trough receiving seed from said guide, a horizontal rotary needle carrier adjacent the trough, a furrow delivery chute, and a plurality of needles carried by the carrier adapted to convey seed from the trough to the chute, and means to return surplus seed from the trough to the hopper.

8. In a potato planting apparatus the combination of a driven shaft, a hopper, a vertical circumferential guide communicating with said hopper, an elevator disk mounted upon said shaft, wings or elevators protruding from said disk and passing through the guide, a depending chute communicating with the upper end of said vertical guide, a horizontal circumferential seed receiving trough in communication with said chute, a horizontal rotary needle carrier adjacent the trough, a furrow delivery chute, a plurality of needles carried by the carrier to convey seed from the trough to the chute, and means to return surplus seed from the trough to the hopper.

9. In potato planting apparatus, a hopper, means to discharge seed therefrom, a vertical circumferential guide receiving seed from said hopper, a rotating disk, elevators protruding from said disk and adapted to traverse said guide, a curved trough receiving seed from said guide, a rotary needle carrier having a series of seed aliners adjacent each slotway adapted to traverse the trough, and a pivoted needle carrying lever adjacent each seed aliner, a spring controlling each needle lever, a furrow delivery chute near one end of the trough, and a chute at the other end of the trough to return seed to the hopper.

10. A potato planting apparatus comprising a hopper, means for feeding seed therefrom, a vertical circumferential guide communicating with said hopper, a rotating disk, elevators protruding from said disk and passing through the vertical guide, a horizontal circumferential seed receiving trough receiving seed from said guide, a horizontal rotary needle carrier comprising a band having a series of slotways therein, a seed aliner adjacent each slotway and passing through the horizontal trough, a pivoted needle carrying crank lever adjacent each slotway, and a spring controlling each crank lever.

11. In potato planting apparatus, the combination of a driven shaft, a hopper having a delivery hole, and a pivoted bottom, a vertical circumferential guide communicating with said delivery hole, an elevator disk mounted upon said shaft, elevators protruding from said disk and passing through the vertical guide, and a curved trough receiving seed from said guide; with a horizontal rotary needle carrier having a series of seed aliners, a pivoted needle carrying crank lever carried by the band adjacent each aliner, a spring controlling each crank lever, a furrow delivery chute near one end of the trough, and a return chute communicating with the other end of the trough and with the hopper.

12. In potato planting apparatus, the combination of a driven shaft, a hopper having a delivery hole, means for delivering seed through said hole, a vertical circumferential guide communicating with said hole, a disk mounted upon said shaft, elevators protruding from said disk and passing through the vertical guide, a curved seed receiving trough receiving seed from said guide, a horizontal rotary needle carrier comprising a band having a series of slotways therein, a seed aliner adjacent each slotway adapted to traverse the trough, a pivoted needle carrying crank lever carried by the band adjacent each slotway, a spring controlling each crank lever, a furrow delivery chute near one end of the horizontal trough and a return chute communicating with the other end of the horizontal trough and with the hopper.

In testimony whereof I affix my signature in presence of two witnesses.

JOHN BRETNELL CRUMP.

Witnesses:
CHARLES SIMON BENOIT,
WESLEY BISHOP.

---

Copies of this patent may be obtained for five cents each, by addressing the "Commissioner of Patents, Washington, D. C."